United States Patent
Hameed

Patent Number: 5,967,212
Date of Patent: Oct. 19, 1999

[54] WHEEL RIM PROTECTOR

[76] Inventor: Hafeez Hameed, 10 Langley Road, Langley, Slough, Berkshire, United Kingdom, SL3 7AA

[21] Appl. No.: 09/082,672

[22] Filed: May 21, 1998

[51] Int. Cl.$^6$ ........................................................ B60B 7/01
[52] U.S. Cl. ...................................... 152/379.4; 301/37.22
[58] Field of Search ............................ 152/379.3, 379.4, 152/379.5, 381.4, 381.5, 381.6, 394, 405; 301/37.22, 37.24

[56] References Cited

U.S. PATENT DOCUMENTS

| | | | |
|---|---|---|---|
| 2,621,979 | 12/1952 | Barnes | 301/37.22 |
| 2,709,472 | 5/1955 | Hofweber | 301/37.22 X |
| 2,915,335 | 12/1959 | Barnes | 301/37.22 |
| 2,977,151 | 3/1961 | Ford, Jr. | 301/37.22 |
| 4,422,490 | 12/1983 | Power | 152/394 |
| 5,071,684 | 12/1991 | Gewecke | 301/37.24 X |
| 5,232,032 | 8/1993 | Diernaz | 152/381.4 X |
| 5,232,034 | 8/1993 | Gergele | 152/381.4 X |

*Primary Examiner*—Russell D. Stormer

[57] ABSTRACT

A new wheel rim protector for protecting the outer lip of a wheel rim, especially an alloy wheel rim, from damage. The inventive device includes an annular main portion having a pair of spaced apart side walls and a base wall connecting the side walls together. The side walls of the main portion define an annular channel between them which is adapted for receiving an outer lip of a wheel rim therein. An annular flange portion is extended from one of the side walls of the main portion. The flange portion is adapted for positioning between a wheel rim and the bead of a tire mounted on the wheel rim.

12 Claims, 2 Drawing Sheets

FIG 1
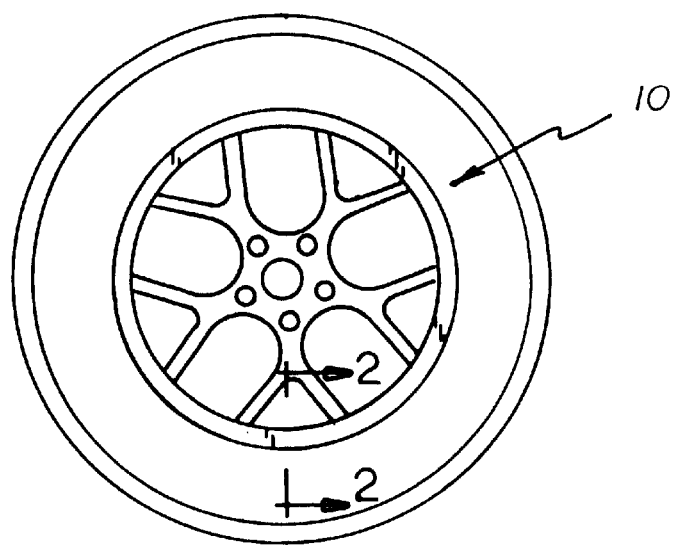
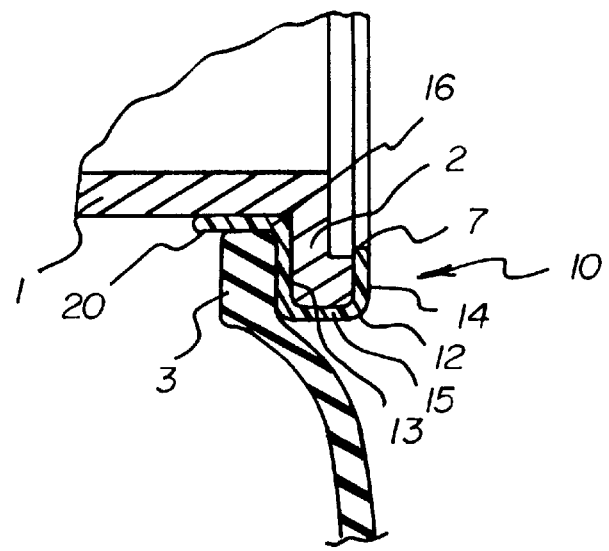
FIG 2

WHEEL RIM PROTECTOR

BACKGROUND OF THE INVENTION

1. Field of the Invention

The present invention relates to protective devices for wheel rims and more particularly pertains to a new wheel rim protector for protecting the outer lip of a wheel rim, especially an alloy wheel rim, from damage.

2. Description of the Prior Art

The use of protective devices for wheel rims is known in the prior art. More specifically, protective devices for wheel rims heretofore devised and utilized are known to consist basically of familiar, expected and obvious structural configurations, notwithstanding the myriad of designs encompassed by the crowded prior art which have been developed for the fulfillment of countless objectives and requirements.

Known prior art protective devices for wheel rims include U.S. Pat. No. 4,252,169; U.S. Pat. No. 3,988,040; U.S. Pat. No. Des. 256,350; U.S. Pat. No. 5,435,630; U.S. Pat. No. 4,295,685; and U.S. Pat. No. 4,844,551.

While these devices fulfill their respective, particular objectives and requirements, the aforementioned patents do not disclose a new wheel rim protector. The inventive device includes an annular main portion having a pair of spaced apart side walls and a base wall connecting the side walls together. The side walls of the main portion define an annular channel between them which is adapted for receiving an outer lip of a wheel rim therein. An annular flange portion is extended from one of the side walls of the main portion. The flange is adapted for positioning between a wheel rim and the bead of a tire mounted on the wheel rim.

In these respects, the wheel rim protector according to the present invention substantially departs from the conventional concepts and designs of the prior art, and in so doing provides an apparatus primarily developed for the purpose of protecting the outer lip of a wheel rim, especially an alloy wheel rim, from damage.

SUMMARY OF THE INVENTION

In view of the foregoing disadvantages inherent in the known types of protective devices for wheel rims now present in the prior art, the present invention provides a new wheel rim protector construction wherein the same can be utilized for protecting the outer lip of a wheel rim, especially an alloy wheel rim, from damage.

The general purpose of the present invention, which will be described subsequently in greater detail, is to provide a new wheel rim protector apparatus and method which has many of the advantages of the protective devices for wheel rims mentioned heretofore and many novel features that result in a new wheel rim protector which is not anticipated, rendered obvious, suggested, or even implied by any of the prior art protective devices for wheel rims, either alone or in any combination thereof.

To attain this, the present invention generally comprises an annular main portion having a pair of spaced apart side walls and a base wall connecting the side walls together. The side walls of the main portion define an annular channel between them which is adapted for receiving an outer lip of a wheel rim therein. An annular flange portion is extended from one of the side walls of the main portion. The flange is adapted for positioning between a wheel rim and the bead of a tire mounted on the wheel rim.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new wheel rim protector apparatus and method which has many of the advantages of the protective devices for wheel rims mentioned heretofore and many novel features that result in a new wheel rim protector which is not anticipated, rendered obvious, suggested, or even implied by any of the prior art protective devices for wheel rims, either alone or in any combination thereof.

It is another object of the present invention to provide a new wheel rim protector which may be easily and efficiently manufactured and marketed.

It is a further object of the present invention to provide a new wheel rim protector which is of a durable and reliable construction.

An even further object of the present invention is to provide a new wheel rim protector which is susceptible of a low cost of manufacture with regard to both materials and labor, and which accordingly is then susceptible of low prices of sale to the consuming public, thereby making such wheel rim protector economically available to the buying public.

Still yet another object of the present invention is to provide a new wheel rim protector which provides in the apparatuses and methods of the prior art some of the advantages thereof, while simultaneously overcoming some of the disadvantages normally associated therewith.

Still another object of the present invention is to provide a new wheel rim protector for protecting the outer lip of a wheel rim, especially an alloy wheel rim, from damage.

Yet another object of the present invention is to provide a new wheel rim protector which includes an annular main portion having a pair of spaced apart side walls and a base wall connecting the side walls together. The side walls of the main portion define an annular channel between them which is adapted for receiving an outer lip of a wheel rim therein. An annular flange portion is extended from one of the side walls of the main portion. The flange is adapted for positioning between a wheel rim and the bead of a tire mounted on the wheel rim.

Still yet another object of the present invention is to provide a new wheel rim protector that protects the lip of a wheel rim from damage when the wheel rim comes into contact with a curb.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic front side view of a new wheel rim protector on a wheel rim according to the present invention.

FIG. 2 is a schematic sectional view of the present invention on a wheel rim taken from line 2—2 of FIG. 1.

DESCRIPTION OF THE PREFERRED EMBODIMENT

Figure 3:
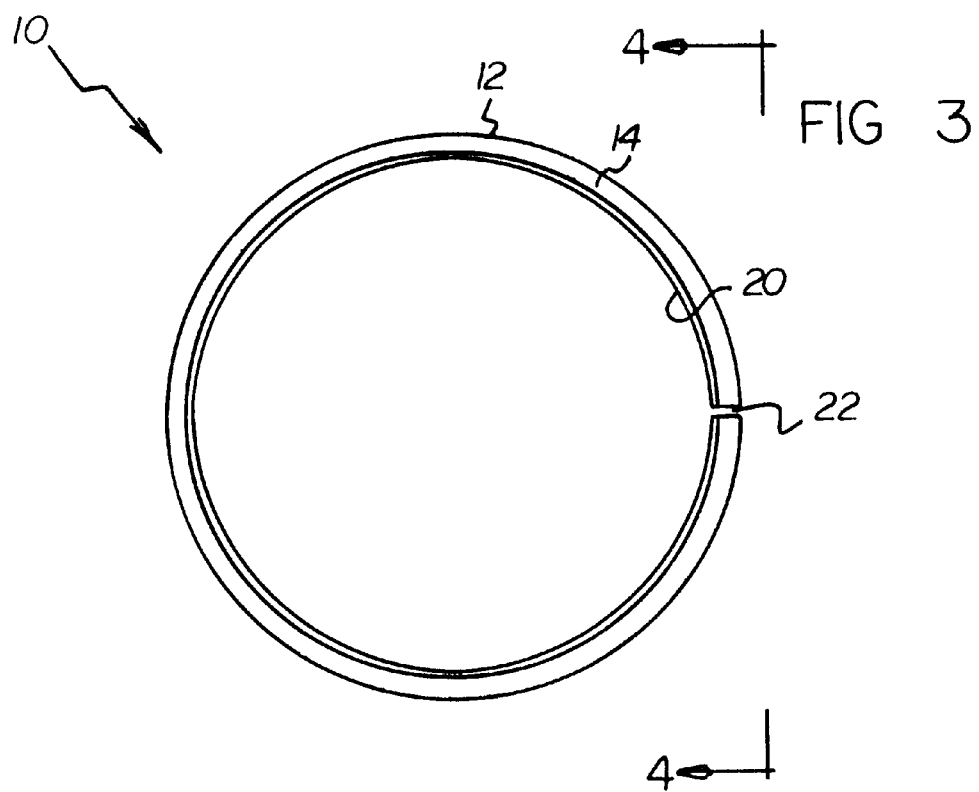
FIG. 3 is a schematic front side view of the present invention.
Figure 4:
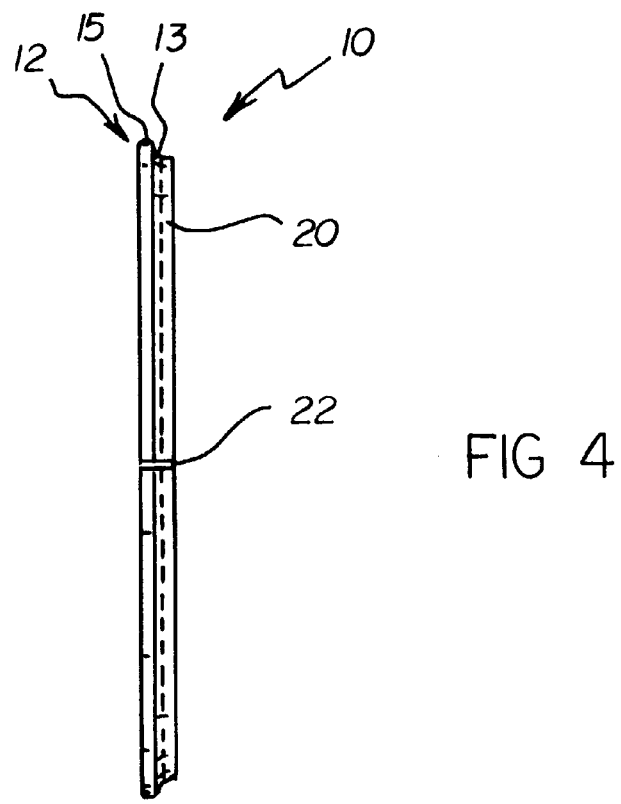
FIG. 4 is a schematic side view of the present invention taken from line 4—4 of FIG. 3.

With reference now to the drawings, and in particular to FIGS. 1 through 4 thereof, a new wheel rim protector embodying the principles and concepts of the present invention and generally designated by the reference numeral 10 will be described.

As best illustrated in FIGS. 1 through 4, the wheel rim protector 10 generally comprises an annular main portion 12 having a pair of spaced apart side walls 13,14 and a base wall 15 connecting the side walls 13,14 together. The side walls 13,14 of the main portion 12 define an annular channel between them which is adapted for receiving an outer lip 2 of a wheel rim 1 therein. An annular flange portion 20 is extended from one of the side walls 13 of the main portion 12. The flange is adapted for positioning between a wheel rim 1 and the bead 3 of a tire mounted on the wheel rim 1.

Specifically, the annular main portion 12 has a generally U-shaped cross section and has a pair of spaced apart side walls 13,14 and a base wall 15 connecting the side walls 13,14 together. Each of the side walls 13,14 ends at a terminal end 16,17 distal the base wall 15. The side walls 13,14 define an annular channel between then that has a generally U-shaped cross section. The channel of the main portion 12 is adapted for receiving an outer lip 2 of a wheel rim 1 therein as shown in FIG. 2.

The annular flange portion 20 is outwardly extended from one of the side walls 13,14 of the main portion 12. Preferably, the flange portion 20 is positioned adjacent the terminal end 16 of the one side wall 13. With reference to FIG. 2, the flange portion 20 is adapted for positioning between a wheel rim 1 and the bead 3 of a tire mounted on the wheel rim 1 when the outer lip 2 of the wheel rim 1 is positioned in the channel of the main portion 12.

In the preferred embodiment, a break 22 is extended through the main portion 12 and the flange portion 20. The break 22 is designed for aiding mounting of the main portion 12 and the flange portion 20 on a wheel rim 1.

Ideally, the main portion 12 and the flange portion 20 are generally transparent such that they are hard to visibly detect when mounting on the outer lip 2 of a wheel rim 1. Even more ideally, the main portion 12 and the flange portion 20 comprise an resiliently elastic material such that the main portion 12 and the flange portion 20 are stretchable over various sized wheel rim 1s and so that they tightly fit over the outer lip 2 of the wheel rim 1. In this ideal embodiment, it is also desirable that the main portion 12 and the flange portion 20 comprises a resiliently compressible material such that they absorb the energy of a collision between the wheel rim 1 and a curb. As an illustrative ideal embodiment, the main portion 12 and the flange portion 20 comprise a material has a mixture of Perspex (polymethyl methacrylate) and an elastic plastic.

In use, the rim protector 10 is designed for mounting to a wheel rim 1 having an annular outer lip 2 adapted for holding the bead 3 of a tire to the wheel rim 1. The main portion is mounted to the wheel rim such that the outer lip is in the annular channel of the main portion and so that the flange portion extends towards the inner side of the wheel rim. The tire is then mounted to the wheel rim so that that flange portion is between the bead and the wheel rim. This way, the tire holds the rim protector to the outer lip of the wheel rim.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A rim protector for a wheel rim having an annular outer lip adapted for holding the bead of a tire to the wheel rim, said rim protector comprising:

an annular main portion having a pair of spaced apart side walls and a base wall connecting said side walls of said main portion, said side walls of said main portion defining an annular channel therebetween, said channel of said main portion being adapted for receiving an outer lip of a wheel rim therein; and an annular flange portion being extended from one of said side walls of said main portion, said flange portion being adapted for positioning between a wheel rim and the bead of a tire mounted on the wheel rim;

wherein a break extends through said main portion and said flange portion, said break being for aiding mounting of said main portion and said flange portion on a wheel rim.

2. The rim protector of claim 1, wherein each of said side walls of said main portion has a terminal end, and wherein said flange portion is positioned adjacent said terminal end of said one of said side walls.

3. The rim protector of claim 1, wherein said main portion and said flange portion are generally transparent.

4. The rim protector of claim 1, wherein said main portion and said flange portion comprise an resiliently elastic material.

5. The rim protector of claim 1, wherein said main portion and said flange portion comprises a resiliently compressible material.

6. A rim protector for a wheel rim having an annular outer lip adapted for holding the bead of a tire to the wheel rim, said rim protector comprising:

an annular main portion having a pair of spaced apart side walls and a base wall connecting said side walls of said main portion, each of said side walls of said main portion having a terminal end, said side walls of said main portion defining an annular channel therebetween, said channel of said main portion being adapted for receiving an outer lip of a wheel rim therein;

an annular flange portion being outwardly extended from one of said side walls of said main portion, said flange portion being positioned adjacent said terminal end of said one of said side walls, said flange portion being adapted for positioning between a wheel rim and the bead of a tire mounted on the wheel rim when the outer lip of the wheel rim is positioned in said channel of said main portion;

a break being extended through said main portion and said flange portion, said break being for aiding mounting of said main portion and said flange portion on a wheel rim;

wherein said main portion and said flange portion are generally transparent;

wherein said main portion and said flange portion comprise an resiliently elastic material; and wherein said main portion and said flange portion comprises a resiliently compressible material.

7. A rim protector for a wheel rim having an annular outer lip adapted for holding the bead of a tire to the wheel rim, said rim protector comprising:

an annular main portion having a pair of spaced apart side walls and a base wall connecting said side walls of said main portion, said side walls of said main portion defining an annular channel therebetween, said channel of said main portion being adapted for receiving an outer lip of a wheel rim therein;

wherein a break extends through said main portion to create ends of said main portion, said ends of said main portion being separable to create a space therebetween to permit expansion of the diameter of the annular main portion to aid mounting of said main portion on a wheel rim.

8. The rim protector of claim 7, wherein each of said side walls of said main portion has a terminal end, and wherein said flange portion is positioned adjacent said terminal end of said one of said side walls.

9. The rim protector of claim 7, further comprising an annular flange portion extending from one of said side walls of said main portion, said flange portion being adapted for positioning between a wheel rim and the bead of a tire mounted on the wheel rim.

10. The rim protector of claim 7, wherein said main portion and said flange portion are generally transparent.

11. The rim protector of claim 7, wherein said main portion and said flange portion comprise an resiliently elastic material.

12. The rim protector of claim 7, wherein said main portion and said flange portion comprises a resiliently compressible material.

\* \* \* \* \*